United States Patent [19]

Böhringer

[11] Patent Number: 4,756,829

[45] Date of Patent: Jul. 12, 1988

[54] VIBRATING DEWATERING MACHINE

[76] Inventor: Paul Böhringer, Heuchlingerstr. 32, D-7101 Dedheim, Fed. Rep. of Germany

[21] Appl. No.: 35,014

[22] Filed: Apr. 6, 1987

[30] Foreign Application Priority Data

Apr. 4, 1986 [DE] Fed. Rep. of Germany ....... 3611235

[51] Int. Cl.⁴ ...................... B01D 21/24; B01D 21/28
[52] U.S. Cl. .................................... 210/241; 210/388; 210/513; 210/523; 209/442; 209/446; 134/120; 134/184
[58] Field of Search ............... 210/241, 248, 385, 388, 210/389, 513, 523, 803; 209/442, 446, 449, 448; 134/117, 120, 150, 184, 185, 187

[56] References Cited

U.S. PATENT DOCUMENTS

| 481,550 | 8/1892 | Dana | 209/446 |
|---|---|---|---|
| 1,644,175 | 10/1927 | Church | 210/388 |
| 2,380,881 | 7/1945 | Trostler et al. | 209/442 |

FOREIGN PATENT DOCUMENTS

| 1804915 | 8/1971 | Fed. Rep. of Germany. |
| 1758484 | 12/1971 | Fed. Rep. of Germany. |
| 3148728 | 12/1982 | Fed. Rep. of Germany. |
| 1129122 | 5/1962 | German Democratic Rep. ................ 209/446 |
| 584889 | 12/1977 | U.S.S.R. ................ 209/442 |
| 1026845 | 7/1983 | U.S.S.R. ................ 210/803 |

*Primary Examiner*—Richard V. Fisher
*Assistant Examiner*—Linda S. Evans
*Attorney, Agent, or Firm*—Holman & Stern

[57] ABSTRACT

To wash and dewater solid-water mixtures in the preparation of construction materials, particularly in recycling processes (processes using recycled waste materials), a sturdy washing trough structure is formed of a sheet steel washing trough to which a vibration box (also solid) is connected on the solids discharge side in order to achieve improved dewatering, and to provide at least one "washing pulsator" and at least one "conveying pulsator", in the form of hydraulic or pneumatic organs, which engage the washing box itself. In addition, with the aid of a hydraulic or pneumatic thrust organ, the entire assembly can be swung up around a swing pivot, said swinging up being toward the solids discharge location; and/or said assembly can be swung up toward the washing water overflow.

10 Claims, 2 Drawing Sheets

VIBRATING DEWATERING MACHINE

BACKGROUND OF THE INVENTION

The invention relates to a device for the cleaning, separation out from a solid-water mixture, and dewatering of solid material present in soiled, polluted, or contaminated solid-water mixtures, the devices of the type including a washing trough over which wash-liquid sprays are operative and which trough is filled with wash liquid up to an overflow on one of its ends, wherewith the other end of said trough is provided with a conveyor disposed above the level of the wash liquid, which conveyor is provided with a vibration mechanism for dewatering the separated-out solids.

A known device of this type includes a machine frame having a conveyor belt stretched over support rollers, tensioning rollers, and conveying rollers, between its side walls. The upper segment of the conveyor belt forms a washing trough filled with washing liquid. The material to be washed is fed in known fashion via a chute. Often, the material will comprise bagged or prepared gravel or other comminuted material, or material in recycling processes such as recycled building materials.

The above-discussed known device is taught in West German Pat. No. DE-31-48-728 and has a vibration compactor. This is disposed in the region below the chute in the part of the upper segment of the conveyor belt which part here is moving above the washing-liquid level in the washing trough and thus outside the washing trough proper. The segment of the conveyor which lies on top of the vibration compactor does not have the same angle of inclination as the walls, i.e., the bottom, of the washing trough. The result of the vibration compactor being located here is that when sand or the like is discharged onto the conveyor from the washing trough against the direction of movement of the soils being washed away from the solids undergoing washing, washing liquid still carried along with the sand at the overflow is vibrated free and flows back into the washing trough. The dewatered solids which have been discharged from the washing trough can then be immediately transported away or further processed after they are released from the conveyor belt.

The known device provides good operating results, although it consumes a great deal of energy and has other disadvantages. Thus, the constantly moving conveyor belt is subject to wear and must be continually replaced, necessitating downtime of the device. Also, e.g., when the conveyor stretches, the individual support rollers must be readjusted, which represents additional maintenance costs. Further, no means of applying forces to intensify the washing process in the washing trough are provided, nor means of tipping the washing trough when it is desired to assist the expulsion of the washed solids or to rapidly empty the washing trough, e.g., when undesirable material has been fed into the device via the feed chute, as may occur with recycled materials.

Accordingly, the underlying problem in the prior art is to devise a device of the type described initially supra, which produces substantially the same results, has a strong and simple structure, does not require readjustment, enables the application of additional forces, and is suitable for processing recycled material.

SUMMARY OF THE INVENTION

In the present invention, washing trough is provided in the form of a washing box which is open on top and is fabricated of steel sheet. This construction matches the vibration mechanism, which is comprised of a vibration box. Because both components are of a solid construction, the vibration box can only execute the dewatering oscillations in a manner independent of the washing trough if said vibration box is connected to the washing trough by an elastic, sealing fitting. The bottom of the vibration box is flush with that of the washing trough so as to create a continuous dewatering and conveying path to the solids discharge end of the device. The vibration mechanism itself can be mounted on a washing box so that the vibration mechanism itself is easily accessible and is protected from dewatered material which is being released on the discharge end, and does not obstruct upward swinging of the assembly despite the presence of any chute or the like under said assembly.

The vibration box advantageously has a rectangular cross section as viewed in the discharge direction. This provides a stable construction which matches the shape of the washing trough, which is open on top, since the bottom and the side walls of the vibration box can be flush with the bottom and the side walls of the washing trough. The vibration mechanism mounted on the vibration box may be a reciprocal vibrator, an unbalanced or eccentric drive mechanism, or the like. A hydraulic motor may be particularly suitable as said mechanism in cases where the other control organs of the device are also hydraulically driven.

The washing box fabricated of steel sheet has a configuration with the bottom of the washing trough being comprised of two bottom segments set at mutually equal angles. The apex forms the lowest point of the washing trough. The angle should be at least 120°, and preferably 130° or more, but less than 180°.

It is advantageous if the slopes of the bottom segments are different in the normal operating position of the washing trough. The first bottom segment (adjoining the liquid overflow) should be steeper, to prevent the solids from escaping over it. A steep slope will cause the solids to continually fall back into the washing trough, so that only wash water and expelled material containing the contaminants will be discharged at the overflow point. The other bottom segment, which extends from the lowest point of the washing trough to the solids discharge point (and thus extends to the vibration box), is given a lower slope, so that the layer of material being formed there is gradually conveyed out of the washing liquid, is further dewatered in the vibration box, and can eventually be discharged ready for shipping or further processing. The angle which the steeper bottom segment forms with the horizontal may be 30°, and the corresponding angle of the less steep bottom segment may be 10°–20°.

The spray means disposed above the level of the washing liquid has its flow advantageously directed toward the washing-water overflow region. It thereby produces a flow directed oppositely to the solids discharge flow, which latter flow is assisted by the water movement produced in the bath. The amount of washing liquid supplied by the spray means can be used to influence the removal of undesired components with the washing liquid over the overflow.

Assistance may be provided to the spray means by other forces which may be applied to the washing water in the washing trough and/or to the solids which are supplied to undergo washing. In this connection, the rigid washing box is elastically mounted on the machine frame, and a "washing pulsator" which generally affects the washing water is mounted on the machine frame, along with at least one "conveying pulsator" which generally affects the solids.

It is also particularly advantageous if the washing trough can be tipped. Tipping in the direction of the solids discharge location enables any solids left in the washing trough after the water has been drained, to be removed quickly when desired. A capability of tipping the washing trough in the opposite direction is also useful, particularly when the device is used in waste recycling processes and when undesired materials reach the washing trough in the processing feed via the feed chute. The entire washing trough can be emptied by tipping it in said opposite direction, so that the emptying is to the location of the overflow where the contaminants are normally expelled. Normal solids washing is then resumed. In this way, downtime of the device can be minimized.

It is particularly advantageous if hydraulic or pneumatic arrangements are used for the washing pulsator, the conveying pulsator, and the lifting organs for the swinging movements. Particularly suitable for use are piston-and-cylinder assemblies. These provide a sturdy and economical organ; the operating parameters of which can be modified by programmatic or remote control, as required during the operation.

BRIEF DESCRIPTION OF THE DRAWINGS

Additional features and details of the invention will be evident from the following description of the drawings.

DETAILED DESCRIPTION OF THE INVENTION

Figure 1:
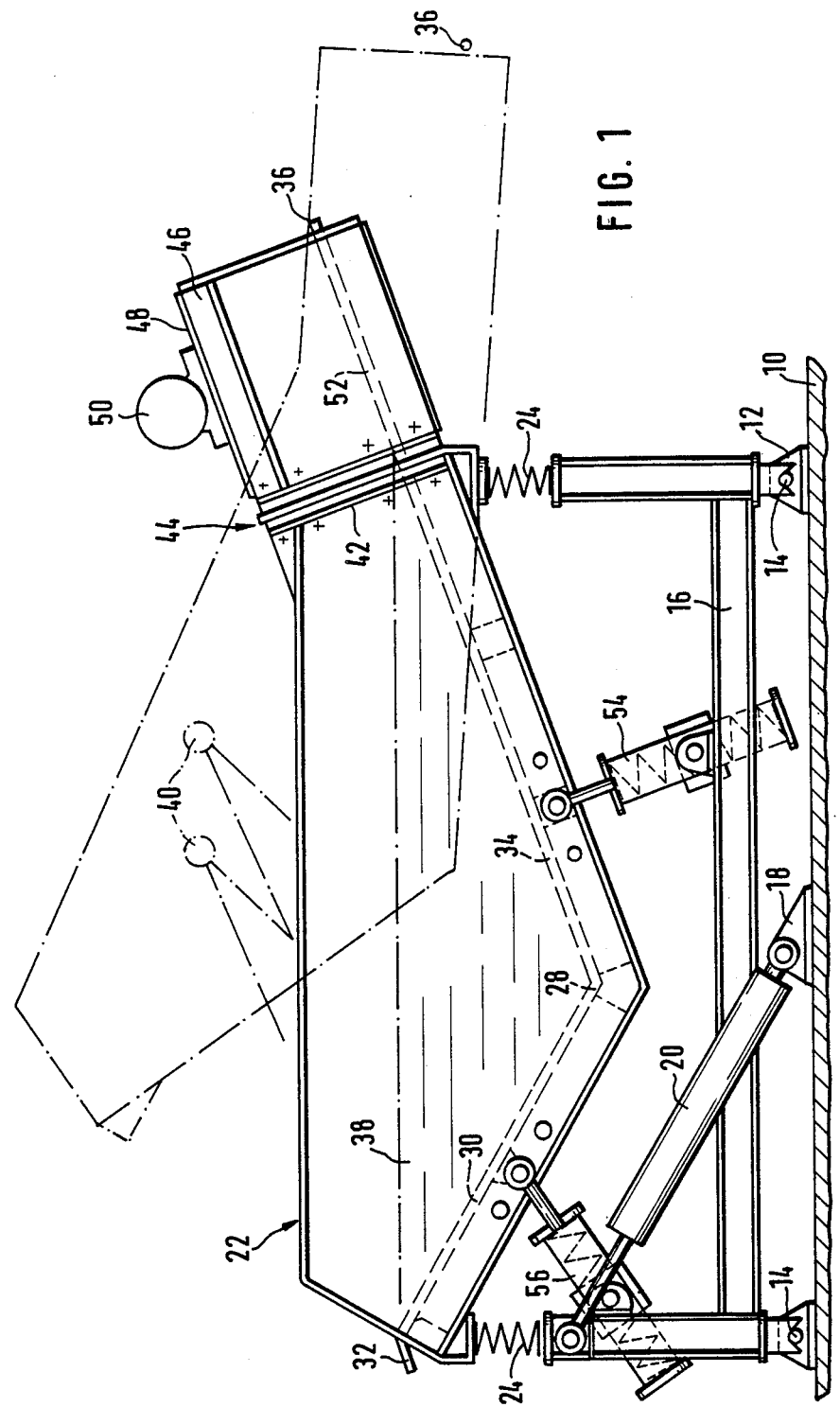
FIG. 1 is a schematic side view of the device according to the present invention.

Pedestals 12 are affixed to a base 10. Lateral cylindrical projections on the pedestals 12 define pivots 14 (FIG. 1). A machine frame 16 rests on the pivots 14, via downwardly open fork bearings.

A second set of pedestals 18 is affixed to the base 10, which pedestals 18 extend in the longitudinal direction and are disposed between the pedestals 12 and in particular on both lateral sides of the device. The position of the pedestals 18 in FIG. 1 is slightly leftward of the midpoint between the end pedestals 12. One end of a thrusting organ 20 is pivotably mounted in an eye of each respective pedestal 18. The organs 20 are in the form of hydraulic (piston and cylinder) jacks. One end of the hydraulic cylinder is attached to the pedestal 18, and on the opposite end of the jack, the free end of the piston rod is pivotably connected to the machine frame 16.

Also shown in FIG. 1 is a component wherewith, when the machine frame 16 is raised from the left pivot 14 and is swung around the right pivot 14, the washing trough 22 can be swung forward from its normal operating position (shown with solid lines) to its emptying position (shown with dot-dashed lines), by thrusting the piston rod of the thrust organ 20 out from the cylinder, with an appropriate control means (known in the art). It is evident that, alternatively, the thrusting device may be such that the swinging upward of the machine frame 16 may be around the left pivot 14 in FIG. 1; or such that the swinging upward may be selectively around one or the other of the two pivots 14 in FIG. 1.

A washing trough 22 is elastically supported by springs 24. It is fabricated of steel sheet material, and has vertical side walls 26 and a washing-trough bottom comprised of the usual two bottom piece segments.

Thus, the washing trough has an apex 28 which is parallel to and at a higher altitude than the pivots 14. A first bottom segment 30 extends at an angle of 30° to the horizontal, from apex 28 to the overflow 32 for the washing liquid. A second bottom segment 34 extends at an angle of 20° to the horizontal, from apex 28 to the solids discharge end 36. Accordingly, the apex angle (at 28) of the bottom configuration of the trough is 130°.

The washing trough 22 is constructed of solid steel sheet material. However, it is advantageous for the functioning of the device if the bottom segments 30,34 are specially adapted on their inside surfaces to separating the given solid or the like from the solids which are being washed, and to furthering the discharge of the solids out of the device via the second bottom segment 34.

The side walls 26 of the washing trough 22 are extended above the liquid level of the washing-liquid 38 which level is defined by the overflow 32. Spray means 40 are mounted here on said side walls, above the level 38, to spray washing liquid (preferably water) onto the washing trough from above. The spray direction is generally toward the overflow, as shown schematically in FIG. 1. This provides further assistance to the washing away of contaminants which have been removed from the solids by dissolution, and to the separation of said contaminants from the solids which are being discharged in the opposite direction.

Figure 2:
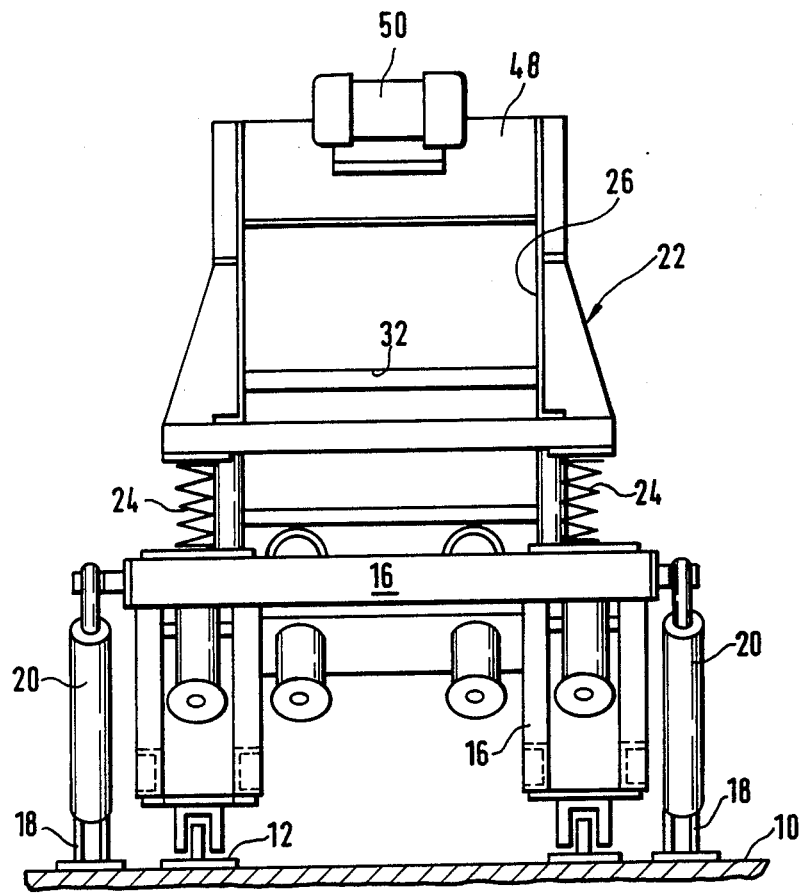
FIG. 2 is an end view of the device of FIG. 1, viewed from the left side of FIG. 1.

On the opposite end from the adjustable overflow 32, the washing trough 22 has an opening 42 formed by cross-sectioning said trough in a plane normal to the second bottom segment 34. Here, elastically sealing fitting means 44 are provided on flanges of the washing trough, for mounting a vibration box 46, which box may be configured as in FIGS. 1 and 2 so as to match the height and width of the washing trough 22. However, in contrast to the washing trough 22, the vibration box 46 is closed on top, and bears a vibration mechanism 50 on its cover plate 48, which mechanism 50 is in the form of an oscillating mechanism, an unbalanced or eccentric transmission, or a hydraulic motor. As seen readily from FIG. 1, the vibration box is disposed such that the vibration bottom 52 in the box 46 is flush with the second bottom segment 34 of the washing trough; and the surface of the washing fluid is terminated exactly at the joint between the vibration bottom 52 and the second bottom segment 34. The vibration mechanism provides additional dewatering of the solids (which are being conveyed rightward from the second bottom segment of the washing trough to the discharge point 36) as they pass through the vibration box 46 over the vibration bottom 52. The water thereby withdrawn from said solids is simply recycled into the washing trough.

A "washing pulsator" 54, comprising a hydraulic (piston-and-cylinder) jack, is installed between the machine frame 16 and the second bottom segment 34. The cylinder is pivotably attached to eyes provided on the machine frame 16, and the outer end of the piston rod is pivotably attached to the washing trough (at a point) below the second bottom segment. The direction of action of the piston rod (and thus of the washing pulsator 54) is perpendicular to the plane of the second bottom segment 34. As the pulsator 54 pulsates this bottom segment at a high stroke frequency, the materials which are deposited on said second segment 34 are increasingly worked upward along said segment, while continuing to be intensively washed; and said materials are also kept in motion so as to be susceptible to the convective conveying motion.

To produce the convective conveying motion, a "conveying pulsator" 56 is installed between the machine frame 16 and the first bottom segment 30 of the washing trough 22. The conveying pulsator is also in the form of a hydraulic (piston-and-cylinder) jack. The direction of action of the piston rod is generally in the direction toward the discharge point 36, but at a slight angle to the second bottom segment 34 of the washing trough 22. Accordingly, if the conveying pulsator is operated against the special bottom installed in the washing trough 22, with, e.g., short strokes and, e.g., a relatively high stroke frequency, a conveying effect is produced toward the discharge point 36. However, because the conveying pulsator 56 is not completely parallel to the bottom segment 34, but is at a slightly steeper angle than segment 34, its stroke results in a kind of tossing action on the solids which have precipitated onto or are lying on the second bottom segment 34, so as to lift said solids from the bottom surface while at the same time moving them toward the discharge location 36. Thus, independently of the washing pulsator 54 which intensifies the washing, the conveying pulsator 56 assists the discharge movement of the solids toward the discharge location 36. Obviously, the configuration of the elastic fitting 44 is such that the vibration mechanism 50 can move the vibration box 46 independently of the oscillations produced in the washing trough 22 by the conveying pulsator 56 (and possibly also the washing pulsator 54).

The thrusting organ 20, the washing pulsator 54, and the conveying pulsator 56, which are e.g., in the form of hydraulic or pneumatic devices, can be controlled remotely and even programmatically, according to the requirements of the material being processed. The optimum washing intensity, and the optimum washing throughput and conveying throughput, may be established, in view of the fact that the stroke length and stroke frequency are independently adjustable. Moveover, they are adjustable during the operation, without having to temporarily stop the apparatus. The variety of possible configurations for the enclosure is broadened by the possibility of tilting the entire assembly, i.e., the washing trough, into the position shown with dot-dashed lines wherewith the lowest point is the discharge location 36, or into the opposite position wherewith the lowest point is the overflow 32. Obviously, the feed chute is disposed so as not to interfere with such tilting movements.

What is claimed is:

1. A dewatering device for the cleaning, separating out and dewatering of solid material present in soiled, polluted or contaminated solid-water mixtures, comprising:

a washing trough fillable with wash-liquid up to the level of a wash-liquid overflow point on one end thereof, said washing trough being in the form of a washing box having an open top, a pair of vertical side walls extending to a level above said wash-liquid overflow point and a bottom wall extending between said side walls, said bottom wall being formed of flat first and second bottom segments set at a mutual angle to one another and jointed at an apex point, said apex point being the lowest point of said washing box and extending transversely thereacross between said side walls, said apex point being located between said wash-liquid overflow point end of said washing box and an end opening of said washing box opposite said wash-liquid overflow point end, said first bottom segment extending longitudinally from said apex point to said overflow point end, and said second bottom segment extending longitudinally from said apex point to said end opening;

a vibration box connected to said end opening of said washing box via an elastically sealing fitting, said vibration box having side walls and a vibration bottom aligned flush with the respective adjoining side walls and second bottom segment of said washing box, the joint between said vibration bottom and said second bottom segment corresponding to the level of said wash-liquid overflow point, said vibration box being closed on top by a cover plate having a vibration mechanism thereon for vibrating said vibration box, said vibration box having a solids-discharge end opposite said end opening of said washing box;

spray means disposed over said washing box above the level of said wash-liquid overflow point end, for spraying wash-liquid onto said washing trough from above;

washing pulsator means acting on said second bottom segment of said washing box in a direction perpendicular to the plane of said second bottom segment, said washing pulsator means being operable for pulsating said washing box bottom wall in said direction of action of said washing pulsator means; and conveying pulsator means acting on said first bottom segment of said washing box in a direction generally toward said solids-discharge end and at a slight angle to said second bottom segment, said conveying pulsator means being operable for pulsating said washing box bottom wall in said direction of action of said conveying pulsator means;

vibration of said vibration box by said vibration mechanism acting on material in said vibration box and above the level of said wash-liquid overflow point, said vibration mechanism moving said vibration box independently of pulsating movement of said washing box produced by at least said conveying pulsator means, said vibration box being operable for dewatering material therein and conveying material over said vibration bottom from said washing box end opening through said vibration box to said solids-discharge end.

2. A device according to claim 1, wherein the vibration box has a rectangular transverse cross section.

3. A device according to claim 1, wherein the vibration mechanism of the vibration box is a hydraulic motor.

4. A device according to claim 1, wherein the bottom wall of the washing box is formed with an opening angle of at least 120° at said apex point, and wherein in the normal operating position of said washing trough, the first bottom segment is more steeply inclined than the second bottom segment.

5. A device according to claim 4, wherein the first bottom segment forms an angle of 30° with the horizontal, and the second bottom segment forms an angle of 10°–20° with the horizontal.

6. A device according to claim 1, wherein the direction of the wash-liquid sprayed from said spray means disposed above the level of the washing liquid is toward the liquid overflow point end and opposite to the direction of discharge of solids from said washing box.

7. A device according to claim 1, further including a pivot disposed under the bottom of the washing trough and which extends transverse to a conveying direction thereof, and a thrust organ disposed under the bottom of said trough for swinging the washing trough upward around said pivot.

8. A device according to claim 7, wherein the thrusting organ, the washing pulsator means, and the conveying pulsator means comprise at least one means from the group consisting of hydraulic means and pneumatic means.

9. A device according to claim 8, wherein the hydraulic means and pneumatic means are piston-and-cylinder units.

10. A device according to claim 1, wherein the washing box is elastically supported on a machine frame, and at least one said washing pulsator means and at least one said conveying pulsator means engages the bottom wall of the washing box below the surface level of the washing liquid.

* * * * *

UNITED STATES PATENT AND TRADEMARK OFFICE
CERTIFICATE OF CORRECTION

PATENT NO. : 4,756,829

DATED : July 12, 1988

INVENTOR(S) : Paul Bohringer

It is certified that error appears in the above-identified patent and that said Letters Patent is hereby corrected as shown below:

Title page:

[76] Inventor: Paul Böhringer, Heuchlingerstr. 32, D-7101 Oedheim, Fed. Rep. of Germany Signed and Sealed this Seventh Day of March, 1989

Attest:

DONALD J. QUIGG

*Attesting Officer*  *Commissioner of Patents and Trademarks*